(12) United States Patent  
Hitaka

(10) Patent No.: US 9,036,946 B2  
(45) Date of Patent: May 19, 2015

(54) IMAGE PROCESSING APPARATUS THAT RETRIEVES SIMILAR IMAGES, METHOD OF CONTROLLING THE SAME, AND STORAGE MEDIUM

(71) Applicant: CANON KABUSHIKI KAISHA, Tokyo (JP)

(72) Inventor: Yosato Hitaka, Tokyo (JP)

(73) Assignee: CANON KABUSHIKI KAISHA (JP)

( * ) Notice: Subject to any disclaimer, the term of this patent is extended or adjusted under 35 U.S.C. 154(b) by 1 day.

(21) Appl. No.: 13/950,398

(22) Filed: Jul. 25, 2013

(65) Prior Publication Data

US 2014/0029869 A1 Jan. 30, 2014

(30) Foreign Application Priority Data

Jul. 30, 2012 (JP) ................................. 2012-168549

(51) Int. Cl.
*G06K 9/54* (2006.01)
*G06F 17/30* (2006.01)

(52) U.S. Cl.
CPC .......... *G06F 17/30244* (2013.01); *G06F 17/30* (2013.01)

(58) Field of Classification Search
USPC .................................. 382/305, 103, 115, 118
See application file for complete search history.

(56) References Cited

U.S. PATENT DOCUMENTS 8,503,735 B2 * 8/2013 Morita .......................... 382/115
8,643,729 B2 * 2/2014 Wang et al. ................. 348/208.1

FOREIGN PATENT DOCUMENTS

JP 2010-039724 A 2/2010

* cited by examiner

*Primary Examiner* — Yon Couso
(74) *Attorney, Agent, or Firm* — Rossi, Kimms & McDowell LLP

(57) ABSTRACT

An image processing apparatus capable of reducing time taken to retrieve a specific image including a specific object area from a plurality of images, even when an image is newly added or a face dictionary is updated. A CPU of the apparatus determines whether or not object search information indicating the image is a candidate image as a candidate of the specific image exists in management information. When the object search information does not exist, the CPU refers to an object dictionary in which feature value data of an objects are registered, and compares feature value data of an object detected from a image and the feature value data of the object dictionary to thereby retrieve candidate images. When the object search information exists, the CPU retrieves candidate images based on the object search information.

18 Claims, 17 Drawing Sheets

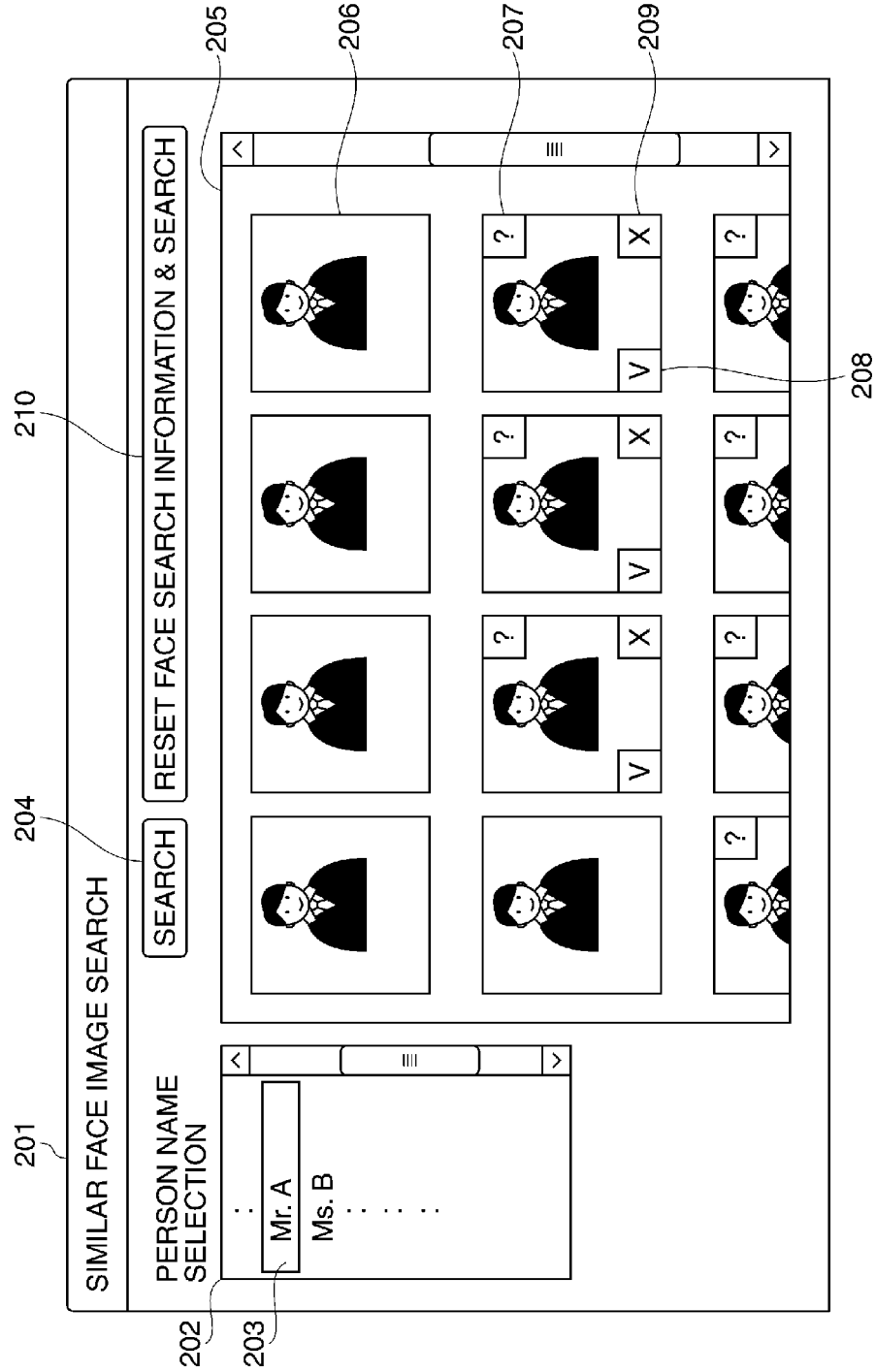

FIG. 3A

310 FACE DICTIONARY

311 FACE DICTIONARY-UPDATED DATE AND TIME
312 PERSON NAME DATA
313 REGISTERED FACE 1
REGISTERED FACE 2
REGISTERED FACE 3
REGISTERED FACE 4
REGISTERED FACE 5

| 2011.07.01 11:23:58 | | 2011.07.01 11:23:58 | |
|---|---|---|---|
| Mr. A — 314 | | Ms. B | |
| FACE IMAGE | FEATURE VALUE DATA — 315 | FACE IMAGE | FEATURE VALUE DATA |
| FACE IMAGE | FEATURE VALUE DATA | FACE IMAGE | FEATURE VALUE DATA |
| FACE IMAGE | FEATURE VALUE DATA | | |
| FACE IMAGE | FEATURE VALUE DATA | | |
| FACE IMAGE | FEATURE VALUE DATA | | |

FIG. 3B

320 IMAGE METADATA

| | | | | |
|---|---|---|---|---|
| 321 IMAGE ID | IMG_0001 | | | |
| 322 PERSON NAME DATA | (BLANK) | | | |
| 323 COMPARED FACE DICTIONARY DATA | Mr. A | Ms. B | Mr. C | ... |
| 324 FACE SEARCH INFORMATION | CANDIDATE IMAGE | NON-CANDIDATE IMAGE | NON-CANDIDATE IMAGE | ... |

FIG. 3C

320 IMAGE METADATA

| | | | | |
|---|---|---|---|---|
| 321 IMAGE ID | IMG_0001 | | | |
| 322 PERSON NAME DATA | Mr. A | | | |
| 323 FACE DICTIONARY DATA | Mr. A | Ms. B | Mr. C | ... |
| 324 FACE SEARCH INFORMATION | DETERMINED IMAGE | NON-CANDIDATE IMAGE | DENIED IMAGE | ... |

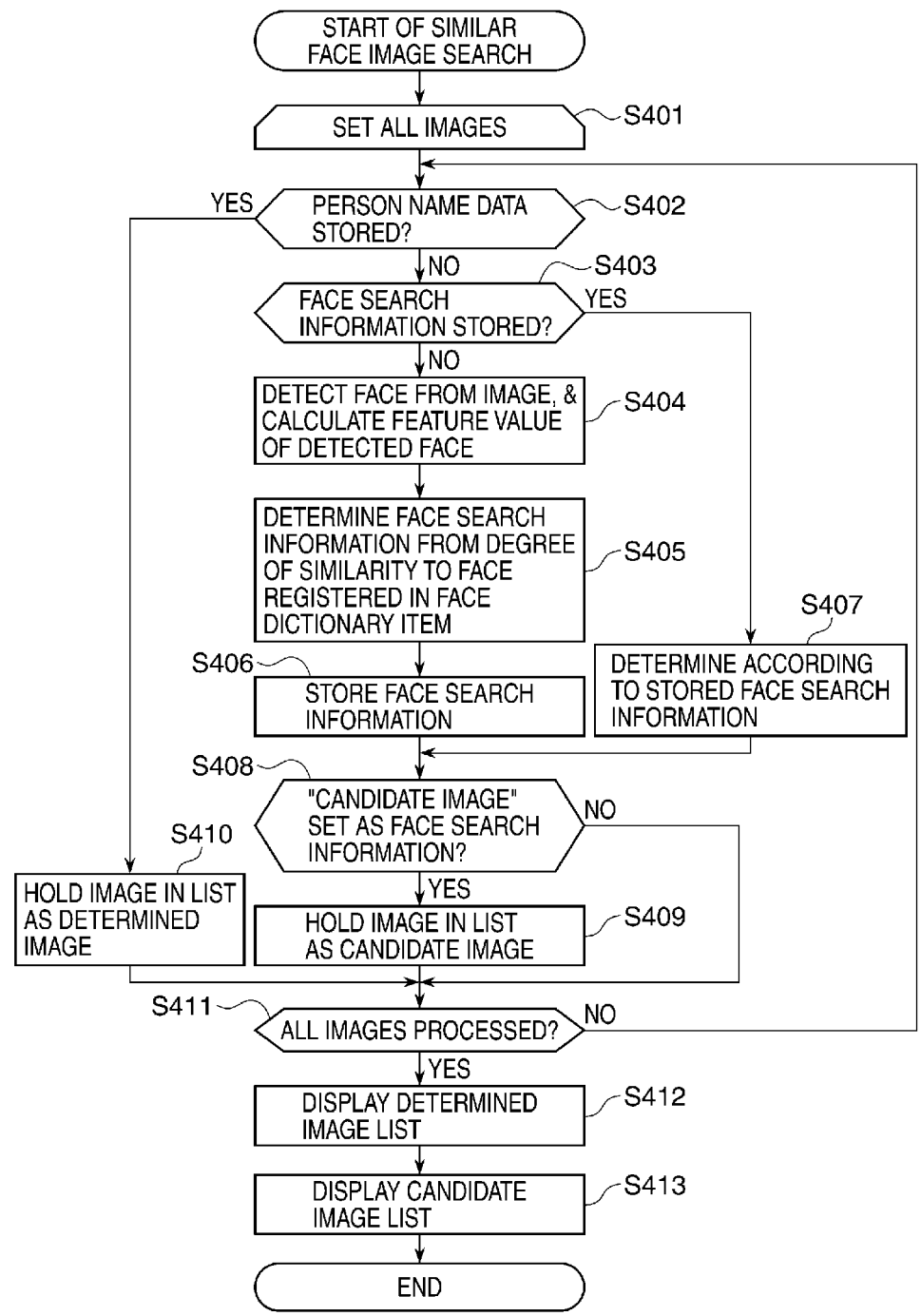

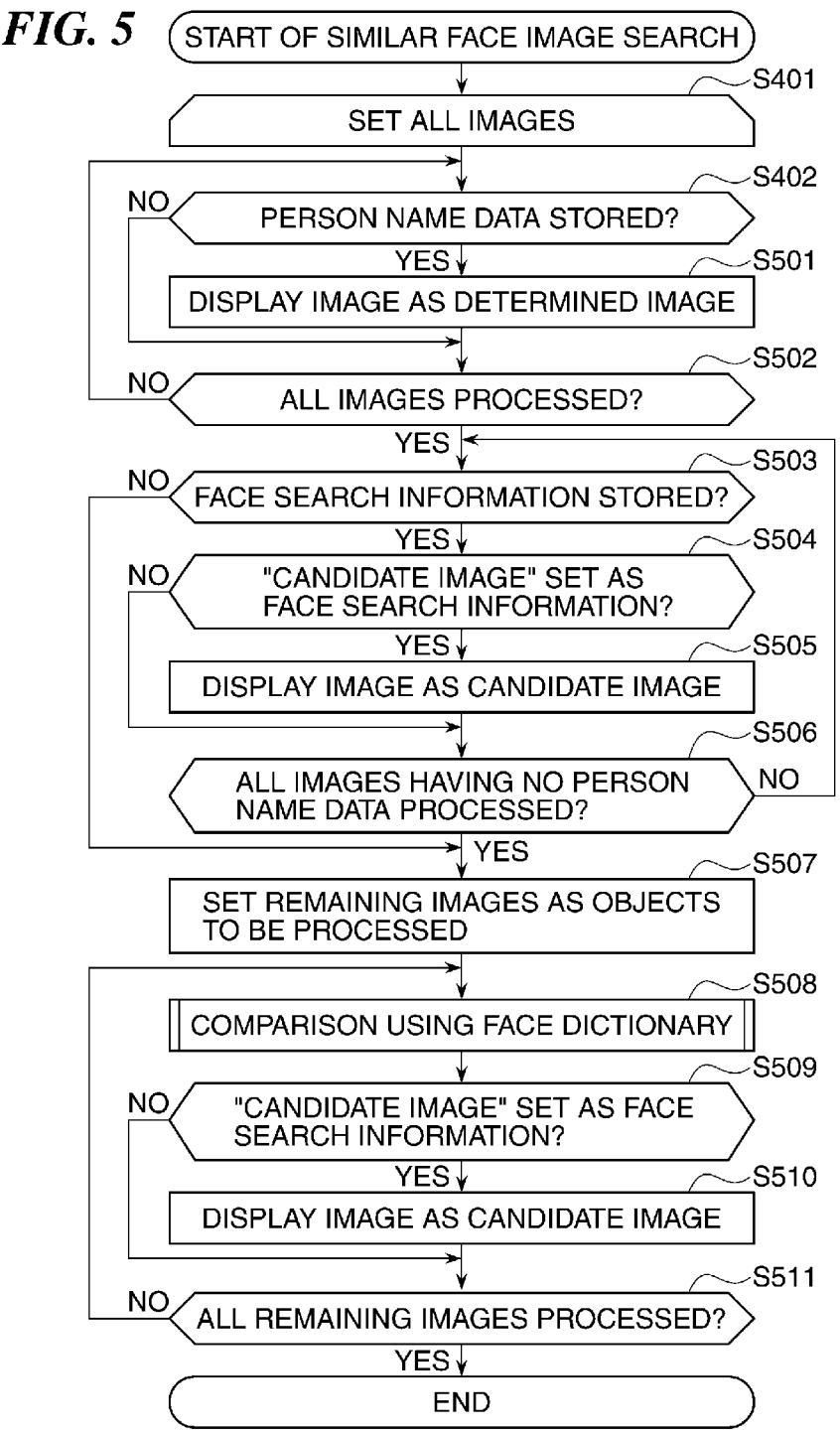

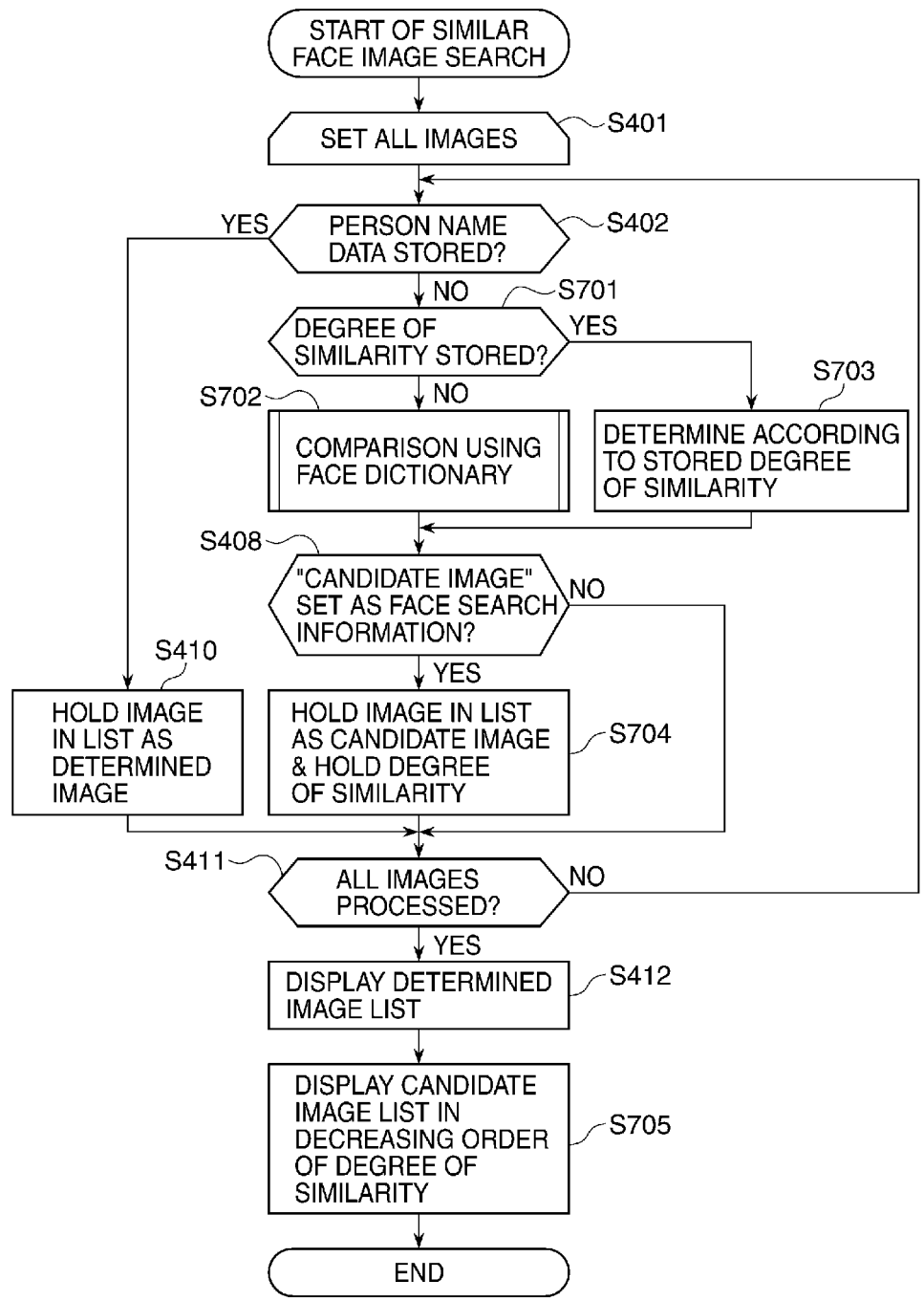

FIG. 8

| | COMPARED FACE DICTIONARY ITEM | Mr. A | Ms. B | Mr. C | ... |
|---|---|---|---|---|---|
| | FACE DICTIONARY ITEM VERSION | 002 | 005 | 003 | ... |
| | FACE 1 | 220 | 190 | 45 | ... |
| | | 002 | 004 | 001 | ... |
| | FACE 2 | 215 | 120 | 130 | ... |
| | | 002 | 004 | 001 | ... |
| | | ⋮ | ⋮ | ⋮ | |
| | FACE 15 | 170 | 250 | 230 | ... |
| | | 002 | 004 | 001 | ... |
| | | ⋮ | ⋮ | ⋮ | |
| | FACE 100,000 | | | 225 | ... |
| | | | | 001 | ... |

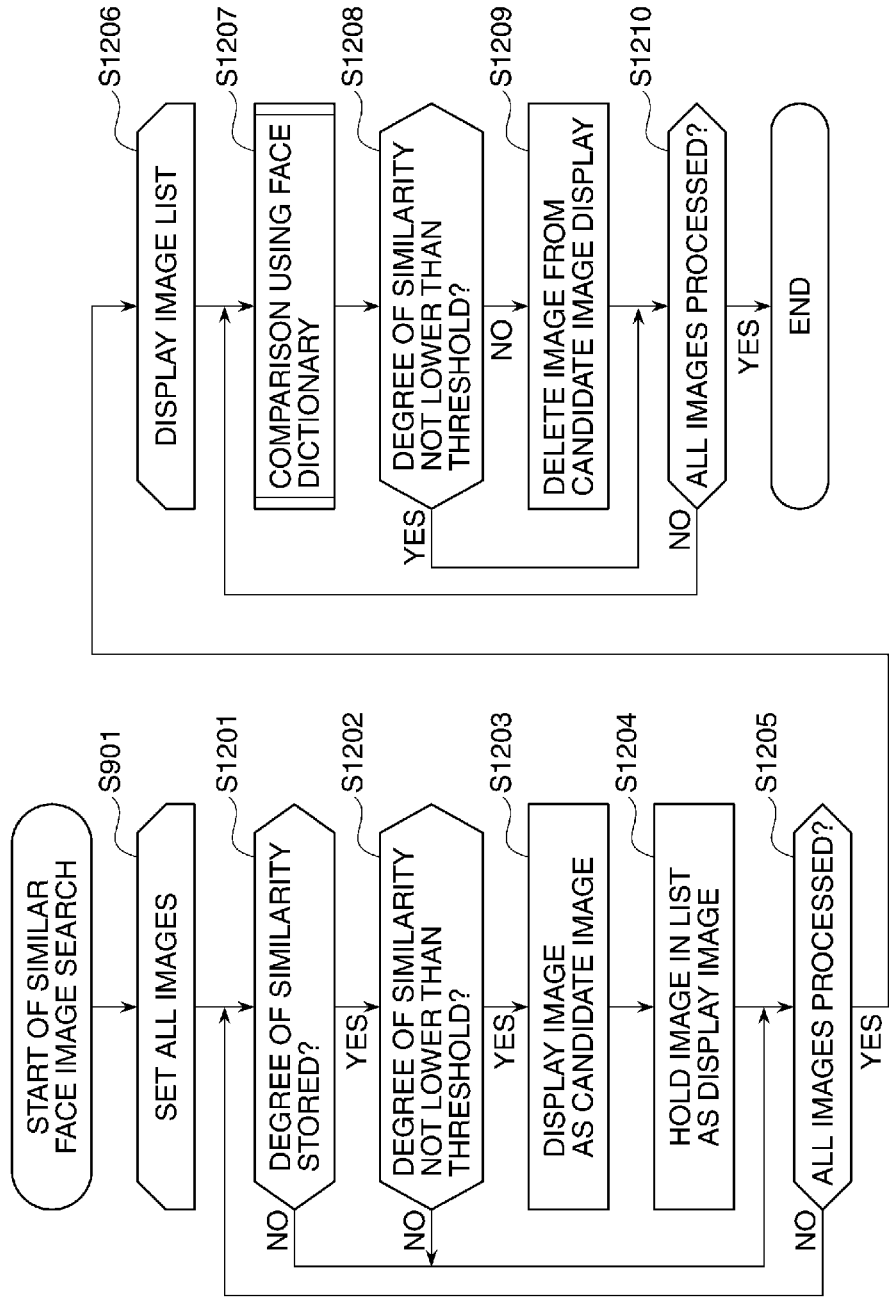

IMAGE PROCESSING APPARATUS THAT RETRIEVES SIMILAR IMAGES, METHOD OF CONTROLLING THE SAME, AND STORAGE MEDIUM

BACKGROUND OF THE INVENTION

1. Field of the Invention

The present invention relates to an image processing apparatus that searches for an image including a specific object image, a method of controlling the same, and a storage medium, and more particularly to an image processing apparatus that searches for an image including a specific face.

2. Description of the Related Art

In general, there has been known a face detection technology for detecting a face area of an object image from an image in which an object is photographed, and moreover, a face identification technology for identifying a person from the detected face area has been put into practical use.

In a PC application using the face identification technology, a face area is detected from an image stored in a PC, and face identification is performed on the detected face area to thereby give a person name to the image. Then, the image is retrieved using the person name.

By the way, a so-called face dictionary is provided in a PC for execution of face identification. Note that the face dictionary is a dictionary in which feature values of persons (particularly e.g. those of faces) in images are associated with person names. For example, images having person feature values close to each are arranged into a group and are displayed on a monitor, and then a person name is added to the group, whereby a face dictionary is created in which the feature values of these images are associated with the person name.

For example, as disclosed in Japanese Patent Laid-Open Publication No. 2010-39724, as a method of retrieving an image including a specific face, there has been proposed one which compares a feature value of a face area detected from an image and a feature value of a specific face included in the face dictionary. In this method, when the detected face area corresponds to the specific face, a file number (file entry) of the image (i.e. an image file) including the detected face area is stored in the face dictionary.

By the way, to retrieve images including a specific face from a number of images and use them as candidate images, first, a feature value is determined with respect to each of all the images. Then, it is necessary to determine whether or not an image is a candidate image, according to a degree of similarity obtained by comparison performed on an image-by-image basis between the feature value of the image and each feature value registered in the face dictionary.

However, to determine whether or not an image is a candidate image by determining a degree of similarity with respect to each of all the images as described above increases not only processing load but also processing time.

On the other hand, according to Japanese Patent Laid-Open Publication No. 2010-39724, the file entries of image files each including a specific face are stored in the face dictionary, and hence image files whose file entries are stored can be retrieved at high speed by using the face dictionary.

However, if an image file (also referred to as an image) is newly added to an image processing apparatus, such as a PC, a file entry of the newly added image file is not stored in the face dictionary yet, and hence the image associated therewith is excluded from candidate images to be retrieved.

As a consequence, if candidate images are searched for again, the search processing has to be performed also with respect to image files which have existed in the image processing apparatus and have not been registered candidate images, which eventually takes increased time to complete the search processing.

Further, when the search for candidate images is performed again after the face dictionary has been updated, it is required to recalculate the above-mentioned feature value because the face dictionary has been updated, and hence the processing time also increases due to this recalculation.

SUMMARY OF THE INVENTION

The present invention provides an image processing apparatus which makes it possible to solve all or at least one of the above-described problems.

In a first aspect of the present invention, there is provided an image processing apparatus that retrieves a specific image including a specific object area from a plurality of images, comprising a storage unit configured to store management information of each of the images, a determination unit configured to determine whether or not object search information exists in the management information, a first processing unit configured to, in a case where the determination unit determines that the object search information does not exist, refer to an object dictionary in which feature value data items of objects are registered, and compare a feature value data item of an object detected from an image and the feature value data items of the object dictionary to thereby retrieve candidate images as candidates of the specific image, and a second processing unit configured to, in a case where the determination unit determines that the object search information exists, retrieve the candidate images based on the object search information.

In a second aspect of the present invention, there is provided a method of controlling an image processing apparatus that retrieves a specific image including a specific object area from a plurality of images, comprising storing management information of each of the images, determining whether or not object search information exists in the management information, referring, in a case where the determining determines that the object search information does not exist, to an object dictionary in which feature value data items of objects are registered, and comparing a feature value data item of an object detected from an image and the feature value data items of the object dictionary to thereby retrieve candidate images as candidates of the specific image, and retrieving, in a case where the determining determines that the object search information exists, the candidate images based on the object search information.

In a third aspect of the present invention, there is provided a non-transitory computer-readable storage medium storing a program for causing a computer to execute a method of controlling an image processing apparatus that retrieves a specific image including a specific object area from a plurality of images, wherein the method comprises storing management information of each of the images, determining whether or not object search information exists in the management information, referring, in a case where the determining determines that the object search information does not exist, to an object dictionary in which feature value data items of objects are registered, and comparing a feature value data item of an object detected from an image and the feature value data items of the object dictionary to thereby retrieve candidate images as candidates of the specific image, and retrieving, in a case where the determining determines that the object search information exists, the candidate images based on the object search information.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a diagram showing an example of a user interface screen displayed on a display section appearing in FIG. 1.

FIGS. 3A to 3C are diagrams each showing the structure of data stored in a secondary storage device appearing in FIG. 1, in which FIG. 3A shows the structure of face dictionary data, FIG. 3B shows the structure of image metadata, and FIG. 3C shows the structure of updated image metadata.

FIG. 4 is a flowchart of a first example of a similar face image search process executed by the image processing apparatus shown in FIG. 1.

FIG. 5 is a flowchart of a second example of the similar face image search process executed by the image processing apparatus shown in FIG. 1.

FIGS. 6A to 6C are flowcharts of variations of the second example of the similar face image search process shown in FIG. 5, in which FIG. 6A is a first variation of the similar face image search process executed in a case where it is determined in a step in FIG. 5 that face search information is stored in the image metadata, FIG. 6B is a second variation of the same executed in the same case as in FIG. 6A, and FIG. 6C is a third variation of the same executed in the same case as in FIG. 6A.

FIG. 7 is a flowchart of a third example of the similar face image search process executed by the image processing apparatus shown in FIG. 1.

FIG. 8 is a diagram useful in explaining a database generated by an image processing apparatus according to a second embodiment of the present invention.

FIG. 15 is a flowchart of a fourth example of the similar face image search process executed by the image processing apparatus according to the second embodiment.

DESCRIPTION OF THE EMBODIMENTS

The present invention will now be described in detail below with reference to the accompanying drawings showing embodiments thereof.

Figure 1:
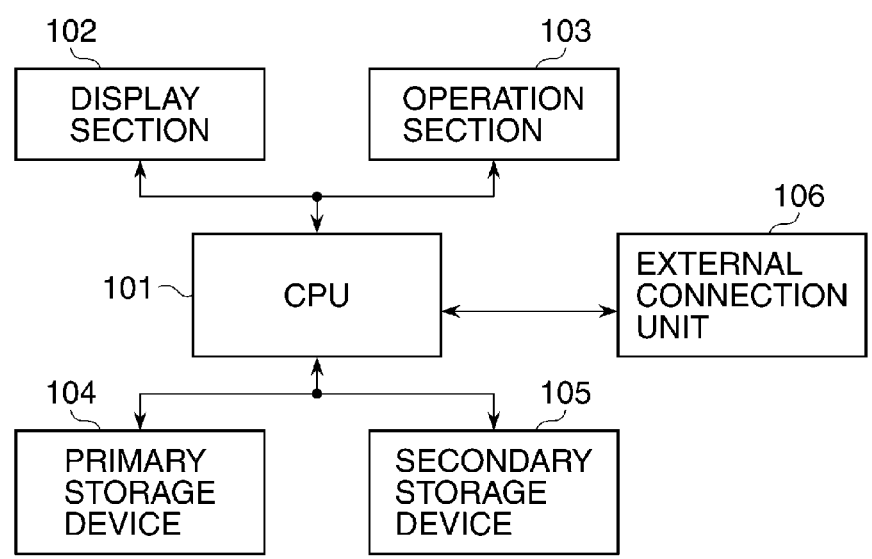
FIG. 1 is a block diagram of an image processing apparatus according to a first embodiment of the present invention.

FIG. 1 is a block diagram of an image processing apparatus according to a first embodiment of the present invention.

The image processing apparatus includes a CPU 101, which controls the overall operation of the image processing apparatus. Connected to the CPU 101 are a primary storage device 104, such as a RAM, and a secondary storage device 105, such as a hard disk.

The secondary storage device 105 stores a database which records images (image files) as objects to be searched, registered person names, and association data associating between the images and the person names.

Further connected to the CPU 101 are a display section 102, an operation section 103, and an external connection unit 106. The display section 102 displays images obtained by retrieval processing, and so on. The operation section 103 includes a mouse and a keyboard. The external connection unit 106 is implemented e.g. by a USB, and a digital camera or the like is connected to the external connection unit 106. Images and the like are acquired from a digital camera via the external connection unit 106, and are stored in the secondary storage device 105.

FIG. 2 is a diagram showing an example of a user interface screen displayed on the display section appearing in FIG. 1.

When a user performs a search operation from the operation section 103 for searching for an image in which a similar face similar to a face (specific face) as a specific object area has been photographed, the CPU 101 displays the user interface screen, denoted by reference numeral 201, on the display section 102.

The user interface screen 201 displays a list (person list) 202 of persons who have been registered in a face dictionary, described hereinafter. In the illustrated example, the face dictionary has a plurality of persons registered therein, and the list of the plurality of persons is displayed.

A selection frame (cursor) 203 is displayed on the person list 202, and the user selects a person from the person list 202 by moving the selection frame 203 using the operation section 103.

Further, a search start button 204 is displayed on the user interface screen 201, and when the search start button 204 is clicked, the CPU 101 starts a similar face image search process, described hereinafter. Then, the CPU 101 displays images associated with the person selected by the selection frame 203 on the display section 102.

An image display area 205 is defined on the user interface screen 201, and the retrieved images are displayed side-by-side on the image display area 205. The image display area 205 displays determined images 206 which have been finally determined as a result of the search. Each determined image 206 is an image which is recognized as a similar image by comparing a face image of a person recognized in the image with an image (face image) associated with a person registered in the face dictionary, and is finally determined by the user that the persons are identical.

Further, candidate images 207 which have been retrieved are displayed on the image display area 205. Each candidate image 207 is an image which is recognized as a similar image by comparing a face image of a person recognized in the image with the image (face image) associated with the person registered in the face dictionary. An icon (question mark) indicating that the image is a candidate image is displayed on the candidate image 207.

Further, a final determination button 208 is displayed on each candidate image 207, and when the user finally determines that the candidate image 207 is an image of the person searched for, the user clicks (depresses) the final determination button 208. When the final determination button 208 is depressed, the CPU 101 sets the candidate image as a determined image.

In addition, a denial button 209 is displayed on the candidate image 207. When the user determines that the candidate image is not an image of the person searched for, to deny the image, the user depresses the denial button 209. When the denial button 209 is depressed, the CPU 101 sets the candidate image 207 as a denied image.

A reset & search button 210 is a button used for resetting face search information held in each image and starting the search processing. The face search information will be described hereinafter.

Although not shown in FIG. 2, there are images which are not recognized as similar images by comparing a face image of a person recognized in the image with the image (face image) associated with the person registered in the face dictionary. This image is referred to as a non-candidate image. As a result of searching for an image including a face similar to the specific face, the images displayed on the image display area 205 are the determined images 206 and the candidate images 207, and the non-candidate images and the denied images are not displayed on the image display area 205.

FIGS. 3A to 3C are diagrams each showing the structure of data stored in the secondary storage device 105 appearing in FIG. 1, in which FIG. 3A shows the structure of face dictionary data, FIG. 3B shows the structure of image metadata, and FIG. 3C shows the structure of updated image metadata.

The face dictionary data (hereinafter simply referred to as the face dictionary), denoted by reference numeral 310, shown in FIG. 3A, is generated by the image processing apparatus. The face dictionary data may be generated by a camera and the generated face dictionary data may be transferred from the camera to the image processing apparatus via the external connection unit 106.

In the face dictionary 310, a date and time at which a face dictionary item, associated with a person, of the face dictionary has been generated or updated is recorded as a face dictionary-updated date and time 311. The face dictionary-updated date and time 311 is used for determining whether or not the face dictionary item has been updated.

Further, each face dictionary item of the face dictionary 310 includes a person name data field 312 in which person name data is recorded, and at least one item of registered face data 313 is registered in association with each one item of the person name data.

The registered face data 313 has a face image 314 and feature value data 315, and the face image 314 is obtained by resizing a face area of a person to a predetermined size. The feature value data 315 (registered feature value data) is data indicative of a feature value extracted from the face image 314.

The number of stored face images 314 and the number of stored feature value data items 315 are each equal to the number of registered face data items. In the illustrated example, each face dictionary item is configured to store five registered face data items at the maximum. Although the face dictionary 310 shown in FIG. 3A has face dictionary items associated with two persons of "Mr. A" and "Ms. B", assuming that the face dictionary 310 stores data of face dictionary items associated with ten persons, the face dictionary 310 serves as a face dictionary for the ten persons.

In FIG. 3B, the image metadata (management information) is accompanying data included in an image (data attached to an image), and is stored in the secondary storage device 105 (memory) as part of the image when the image is captured into the image processing apparatus. Further, management information attached to a plurality of image data items managed by the image processing apparatus may be collected and stored in the secondary storage device 105 as a database, and the management information in the database may be made use of when searching for an image. In the present invention, the management information used for the search may be stored in an image or a database outside the image.

The image metadata, denoted by reference numeral 320, has an image ID area 321 for identifying an image, and a number or name is set as an image ID in the image ID area 321. In the illustrated example, "IMG_0001" is recorded as the image ID.

Further, the image metadata 320 has a person name data area 322, in which person name data (specific information) in the face dictionary is held when the image has been set as the determined image by the similar face image search process. When the image is not a determined image, the person name data area 322 is "blank". In a compared face dictionary data area 323, data for identifying a face dictionary (object dictionary) data item selected in the similar face image search is recorded. In this example, the person name data is recorded.

In a face search information area 324, face search information (object search information) is recorded. The face search information is data indicative of a result obtained by comparing the feature value data of a face image of a person recognized in an image with the feature value data of a face dictionary data item selected by the similar face image search.

Here, the comparison result is quantified into a number, and if the degree of similarity is not lower than a predetermined threshold value, "candidate image" is set as the face search information. On the other hand, if the degree of similarity is lower than the predetermined threshold value, "non-candidate image" is set as the face search information. Note that a degree of similarity (numerical value) obtained by comparing the feature value data of the recognized face image with each feature value data item of the face dictionary may be directly used as the face search information.

As described above, when the final determination button 208 or the denial button 209 on an image displayed as the candidate image is depressed, the candidate image is switched to a determined image or a denied image.

As shown in FIG. 3C, in a case where the selected face dictionary data item is a face dictionary data item of "Mr. A", when an image displayed as a candidate image is set to the determined image by depressing the final determination button 208, the CPU 101 sets the face search information 324 associated with "Mr. A" to the determined image. Then, the CPU 101 sets "Mr. A" in the person name data area 322 as the person name (i.e. updates the person name data area 322).

Further, in a case where the selected face dictionary data item is a face dictionary of "Mr. C", for example, when an image displayed as a candidate image is set to the denied image by depressing the denial button 209, the CPU 101 sets the face search information 324 associated with "Mr. C" to the denied image.

Although in the illustrated example in FIGS. 3A to 3C, the image metadata is described as the accompanying data included in an image, the accompanying data may be recorded in the secondary storage device 105 separately from the image in association with the image.

FIG. 4 is a flowchart of a first example of the similar face image search process for searching for an image having a similar face which is similar to a specific face, executed by the image processing apparatus shown in FIG. 1. Note that the similar face image search process is executed by the CPU 101.

As mentioned hereinabove, when the user performs the search operation from the operation section 103 for searching for an image including a similar face which is similar to a specific face, the CPU 101 displays the user interface screen 201 on the display section 102. When the search start button 204 is depressed on the user interface screen 201, the CPU 101 starts the similar face image search process.

The CPU 101 sets all of the images stored in the secondary storage device 105 as objects to be subjected to similar face image search (step S401). Then, the CPU 101 determines, for a first one of the images, whether or not a person name data item is stored in the image metadata thereof (step S402). If the person name data is not stored in the image metadata (NO to the step S402), the CPU 101 determines whether or not the face search information is stored in the image metadata (step S403).

If the face search information is not stored in the image metadata (NO to the step S403), the CPU 101 executes a comparison process using the face dictionary. In the comparison process using the face dictionary, first, the CPU 101 detects a face area (also simply referred to as "a face") from the image, and calculates feature value data indicative of a feature value of the face (step S404).

Next, the CPU 101 compares the feature value data of a registered face data item in the face dictionary 301 with the calculated feature value data to thereby calculate a degree of similarity. Then, the CPU 101 sets the face search information according to the degree of similarity (step S405). For example, if the degree of similarity is not lower than the predetermined threshold value, the CPU 101 sets "candidate image" as the face search information. On the other hand, if the degree of similarity is lower than the predetermined threshold value, the CPU 101 sets "non-candidate image" as the face search information. Then, the CPU 101 writes the face search information in the image metadata (stores the face search information: step S406).

If the face search information is stored in the image metadata (YES to the step S403), the CPU 101 determines that the following determination is to be executed using the face search information (step S407).

After execution of the step S406 or S407, the CPU 101 executes the determination as to whether or not "candidate image" is set as the face search information (step S408). If "candidate image" is set as the face search information (YES to the step S408), the CPU 101 holds the image in a candidate image list as a candidate image (step S409). This candidate image list is temporarily stored in the primary storage device 104.

If it is determined in the step S402 that the person name data is stored in the image metadata (YES to the step S402), the CPU 101 holds the image in a determined image list as a determined image (step S410). The determined image list is temporarily stored in the primary storage device 104.

Then, the CPU 101 determines whether or not the similar face image search has been completed for all of the images (step S411). If the similar face image search has not been completed for all of the images (NO to the step S411), the CPU 101 sets a next image as an object to be subjected to the determination in the step S402, and returns to the step S402.

On the other hand, if the similar face image search has been completed for all of the images (YES to the step S411), the CPU 101 displays the determined image list on the image display area 205 (step S412). Next, the CPU 101 displays the candidate image list on the image display area 205 (step S413), followed by terminating the similar face image search.

If "candidate image" is not set as the face search information (NO to the step S408), the CPU 101 proceeds to the step S411.

As describe above, in the similar face image search process shown in FIG. 4, the similar face image search is performed for all images, and the determined images 206 and the candidate images 207 are displayed on the image display area 205.

By the way, in the similar face image search process described with reference to FIG. 4, the determined image list and the candidate image list are stored in the primary storage device 104, and are displayed on the image display area 205 after the similar face image search is performed for all images.

In the similar face image search, the user is caused to wait until the lists are displayed on the image display area 205, i.e. until the process is completed for all images, which takes time before the user can perform a next operation according to the result of the similar face image search.

To cope with this inconvenience, in retrieving images each including a face similar to a specific face, first, images each having a person name data item are retrieved and displayed on the image display area 205. Next, images each having face search information are retrieved and displayed on the image display area 205. Then, finally, the comparison process is performed on images having neither a person name data item nor face search information, using the face dictionary, and each image is displayed or not displayed on the image display area 205 according to a result of the comparison process.

FIG. 5 is a flowchart of a second example of the similar face image search process executed by the image processing apparatus shown in FIG. 1. Note that this similar face image search process is executed by the CPU 101. Further, the same steps as those in the similar face image search process in FIG. 4 are denoted by the same step numbers, and description thereof is omitted.

When the similar face image search is started, the CPU 101 executes the steps S401 and S402. If it is determined in the step S402 that an image has a person name data item stored in image metadata thereof (YES to the step S402), the CPU 101 displays the image on the image display area 205 as a determined image (step S501). Then, the CPU 101 determines whether or not all of the images have been checked as to a person name data item (step S502).

If all of the images have not been checked as to a person name data (NO to the step S502), the CPU 101 sets a next image as an object to be subjected to the determination in the step S402, and returns to the step S402. Note that if the person name data is not stored in the image metadata (NO to the step S402), the CPU 101 directly proceeds to the step S502.

If all of the images have been checked as to person name data (YES to the step S502), the CPU 101 determines, for one of images having no person name data item, whether or not face search information is stored in image metadata of the image (step S503). If the face search information is stored in the image metadata (YES to the step S503), the CPU 101 determines, with reference to the face search information, whether or not the image is a candidate image. That is, the CPU 101 determines whether or not "candidate image" is set as the face search information associated with the image (step S504).

If "candidate image" is set as the face search information (YES to the step S504), the CPU 101 displays the image on the image display area 205 as a candidate image (step S505). Then, the CPU 101 determines whether or not all of the images having no person name data have been checked as to face search information (step S506). Note that if "candidate image" is not set as face search information (NO to the step S504), the CPU 101 directly proceeds to the step S506.

If all of the images having no person name data have not been checked as to face search information (NO to the step S506), the CPU 101 sets a next image having no person name data as an object to be subjected to the determination in the step S503, and returns to the step S503. Note that if face search information is not stored in the image metadata (NO to the step S503), the CPU 101 directly proceeds to the step S506.

On the other hand, if all of the images having no person name data have been checked as to face search information (YES to the step S506), the CPU 101 sets a first one of the remaining images (i.e. all of images having neither person name data nor face search information) as an object to be processed (step S507), and executes the comparison process thereon, using the face dictionary (step S508). The comparison process in the step S508 is the same as executed in the steps S404 to S406 described with reference to FIG. 4.

Next, the CPU 101 determines, with reference to face search information obtained by the comparison process, whether or not the image is a candidate image. That is, the CPU 101 determines whether or not "candidate image" is set as the face search information associated with the image (step S509).

If "candidate image" is set as the face search information (YES to the step S509), the CPU 101 displays the image on the image display area 205 as a candidate image (step S510). Then, the CPU 101 determines whether or not the similar face image search has been completed for all of the remaining images (step S511). Note that if "candidate image" is not set as the face search information (NO to the step S509), the CPU 101 directly proceeds to the step S511.

If the similar face image search has not been completed for all of the remaining images (NO to the step S511), the CPU 101 sets a next one of the remaining images as an object to be subjected to the comparison process in the step S508, and returns to the step S508. On the other hand, if the similar face image search has been completed for all of the remaining images (YES to the step S511), the CPU 101 terminates the present similar face image search process.

By thus configuring the similar face image search process, when executing the similar face image search, images which are determined images having person name data, and images having "candidate image" set as face search information can be easily retrieved by referring to image metadata thereof, and as a result, the user is not caused to wait until the processing is completed for all of the images.

Figure 6A:
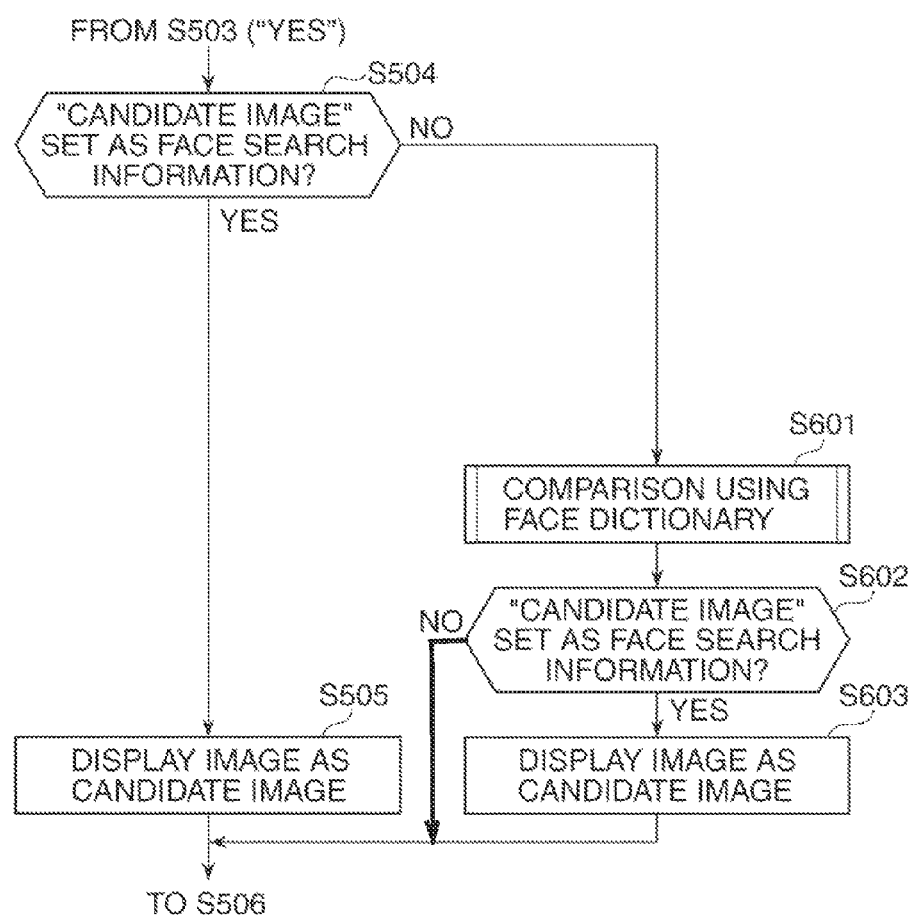
Figure 6B:
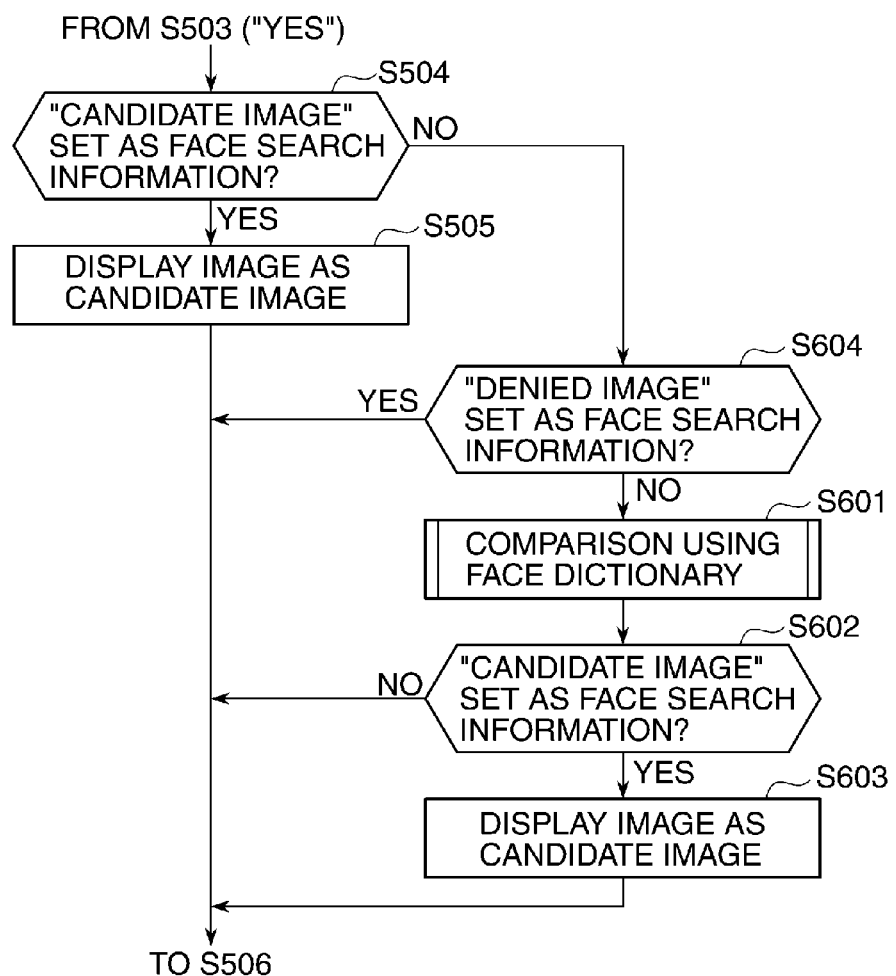
Figure 6C:
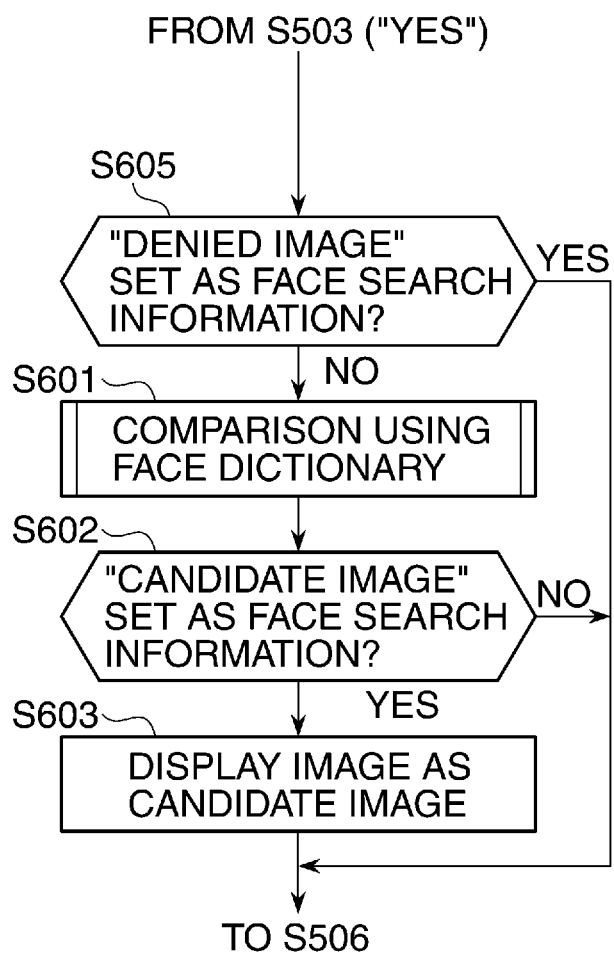

FIGS. 6A to 6C are flowcharts of variations of the second example of the similar face image search process in FIG. 5. FIG. 6A is a first variation of the similar face image search process executed in a case where it is determined in the step 503 in FIG. 5 that the face search information is stored in the image metadata, FIG. 6B is a second variation of the same executed in the same case as in FIG. 6A, and FIG. 6C is a third variation of the same executed in the same case as in FIG. 6A.

When a face dictionary item has been updated as well, the similar face image search is performed according to the similar face image search process described with reference to FIG. 5. In this case, however, for example, as shown in FIG. 6A, if it is determined in the step S503 that face search information is stored in image metadata (YES to the step S503), the CPU 101 determines whether or not "candidate image" is set as the face search information in the step S504.

If "candidate image" is set as the face search information (YES to the step S504), the CPU 101 displays the image on the image display area 205 as the candidate image in the step S505, and then proceeds to the step S506.

On the other hand, if "candidate image" is not set as the face search information (NO to the step S504), the CPU 101 executes the comparison process using the face dictionary for an image having no person name data (step S601). The comparison process in the step S601 is the same as executed in the step S508 in FIG. 5.

Then, the CPU 101 determines, with reference to the face search information obtained by the comparison process, whether or not the image is a candidate image. That is, the CPU 101 determines whether or not "candidate image" is set as the face search information associated with the image (step S602). The step S602 is the same as the step S509 in FIG. 5.

If "candidate image" is set as the face search information (YES to the step S602), the CPU 101 displays the image on the image display area 205 as a candidate image (step S603). The step S603 is the same as the step S510 in FIG. 5. Then, the CPU 101 proceeds to the step S506.

If "candidate image" is not set as the face search information (NO to the step S602), the CPU 101 directly proceeds to the step S506.

As described above, when a face dictionary item is updated, images each having "candidate image" set in face search information are displayed as candidate images, and images which are not candidate images and newly added images are compared with the updated face dictionary item, and each image is displayed or not displayed according to the result of comparison process.

When a face dictionary item is updated, processing shown in FIG. 6B may be executed. In FIG. 6B, the same steps as those in the process shown in FIG. 6A are denoted by the same step numbers, and description thereof is omitted.

If it is determined in the step S504 that "candidate image" is not set as face search information (NO to the step S504), the CPU 101 determines whether or not "denied image" is set as the face search information (step S604). If "denied image" is not set as the face search information (NO to the step S604), the CPU 101 proceeds to the step S601.

On the other hand, if "denied image" is set as the face search information (YES to the step S604), the CPU 101 proceeds to the step S506.

As described above, in the example shown in FIG. 6B, when "denied image" is set as the face search information, even if face dictionary items have been updated, the comparison process using the face dictionary is not executed.

Now, when the reset & search button 210 is depressed on the user interface screen 201, the face search information held in the image is reset. When the reset & search button 210 is depressed as well, the similar face image search is performed according to the similar face image search process described with reference to FIG. 5. In this case, however, for example, as shown in FIG. 6C, if it is determined in the step S503 that face search information is stored in image metadata (YES to the step S503), the CPU 101 determines whether or not "denied image" is set as the face search information (step S605).

If "denied image" is not set as the face search information (NO to the step S605), the CPU 101 proceeds to the step S601 described with reference to FIG. 6A. On the other hand, if "denied image" is set as the face search information (YES to the step S605), the CPU 101 directly proceeds to the step S506.

FIG. 7 is a flowchart of a third example of the similar face image search process executed by the image processing apparatus shown in FIG. 1. The similar face image search process in FIG. 7 is executed by the CPU 101. Further, the same steps in the similar face image search process in FIG. 7 as those the similar face image search process in FIG. 4 are denoted by the same step numbers, and description thereof is omitted.

If it is determined in the step S402 described with reference to FIG. 4 that an image does not have a person name data item stored in image metadata thereof, the CPU 101 determines whether or not a degree of similarity indicative of the level of similarity of the image to the specific face is stored in the secondary storage device 105 (step S701). If the degree of similarity is not stored (NO to the step S701), the CPU 101 executes the comparison process for the image using the face dictionary (step S702). The comparison process in the step S702 is the same as executed in the steps S404 to S406 described with reference to FIG. 4.

On the other hand, if a degree of similarity is stored (YES to the step S701), the CPU 101 determines, based on the stored degree of similarity, whether or not the image is a candidate image to thereby set the face search information (step S703).

After execution of the step S702 or S703, the CPU 101 executes the step S408 described with reference to FIG. 4, whereby if "candidate image" is set as the face search information (YES to the step S408), the CPU 101 stores the image as a candidate image in the candidate image list in the primary storage device 104, and stores the degree of similarity in the primary storage device 104 (step S704).

After displaying the determined image list on the image display area 205 in the step S412, the CPU 101 displays the candidate image list on the image display area 205 in the order of the degree of similarity (i.e. in decreasing order of the degree of similarity) (step S705), followed by terminating the similar face image search process.

As described above, in the example shown in FIG. 7, the degrees of similarity of respective candidate images are held together with the candidate image list, and the candidate images are displayed on the image display area 205 in decreasing order of the degree of similarity. This enables the user to easily recognize which candidate image is similar to the specific image.

Next, a description will be given of an image processing apparatus according to a second embodiment of the present invention. The image processing apparatus according to the second embodiment has the same arrangement as the image processing apparatus shown in FIG. 1.

In the first embodiment, as shown in FIG. 3B, the image metadata holds respective results of comparison between the feature value data of a face image of a person recognized in an image and the feature value data of registered face image data items, selected by the similar face image search, in the face dictionary. Further, "candidate image" or "non-candidate image" is set as face search information according to the degree of similarity.

In the second embodiment, a database is caused to hold respective results of comparison between the feature value data of a face image of a person recognized in an image and the feature value data of registered face image data items, selected by the similar face image search, in the face dictionary. This database holds each result of comparison as a degree of similarity (value), and further, face dictionary information associated with a face dictionary item used for the comparison and version information of the face dictionary item, on an image-by-image basis. Note that the database is stored e.g. in the secondary storage device 105.

FIG. 8 is a diagram useful in explaining the database generated by the image processing apparatus according to the second embodiment.

The illustrated database, denoted by reference numeral 800, stores n image identification data items i.e. face 1, face 2, ..., and face n, for identifying n (in this example, n=100,000) images. A compared face dictionary item (face dictionary item for comparison) box 801 stores face dictionary item identification data for identifying a face dictionary item used for comparison with the feature value data of a face image of a person recognized in an image. For example, the face dictionary item identification data is person name data, and "Mr. A", for example, is set as the face dictionary item identification data.

A face dictionary item version box 802 stores a face dictionary item version indicative of a version of a face dictionary item. For example, the face dictionary item version box 802 indicates that the version of the face dictionary item of "Mr. A" is 002. When the face dictionary item is updated, the face dictionary item version is incremented.

A similarity box 803 stores a degree of similarity obtained as a result of comparison between the feature value data of a face image of a person recognized in an image and the feature value data of a registered face image data item, selected by the similar face image search, in the face dictionary. Further, a similarity & face dictionary item version box 804 stores the version of the face dictionary item used in the comparison process as a similarity & face dictionary item version.

In the example of the database 800 shown in FIG. 8, the degree of similarity obtained as a result of comparison between the feature value data of an image corresponding to face 1 and the feature value data of the face dictionary item of "Ms. B" is "190", and the similarity & face dictionary item version concerning "Ms. B" at the time is "004". The face dictionary item version of "Ms. B" is "005", which indicates that this face dictionary item is once updated after the degree of similarity is determined.

In the illustrated example, as indicated by reference numeral 805, the similarity box 803 and the similarity & face dictionary item version box 804 associated with an image corresponding to face 100,000 are blank, which indicates that after the image corresponding to face 100,000 has been added to the image processing apparatus, the process for comparing the feature value data thereof with the feature value data of the face dictionary item of "Mr. A" to determine a degree of similarity has not been executed yet.

In the example shown in FIG. 8, assuming that the predetermined threshold value mentioned hereinabove in the first embodiment is set to "200", in the similar face image search, if an image of a face dictionary item has a degree of similarity not lower than 200, the image of the face dictionary item is displayed as a candidate image.

After a face dictionary item has been updated, to search for images including a face similar to a specific face, first, as to an image of which the degree of similarity determined by comparison using the face dictionary item before the update is not lower than the predetermined threshold value, a degree of similarity is determined using the updated face dictionary, and the thus determined degree of similarity is compared with the threshold value. Then, if the newly determined degree of similarity is not lower than the threshold value, the image is displayed as a candidate image.

Further, as for an image having no data of similarity calculated using the face dictionary item before the update, if a degree of similarity determined using the updated face dictionary item is not lower than the predetermined threshold value, the image is displayed as a candidate image.

Then, in a case where the degree of similarity of an image calculated using the face dictionary item before the update is lower than the predetermined threshold value, if the degree of similarity calculated using the updated face dictionary item is not lower than the predetermined threshold value, the image is displayed as a candidate image.

Figure 9:
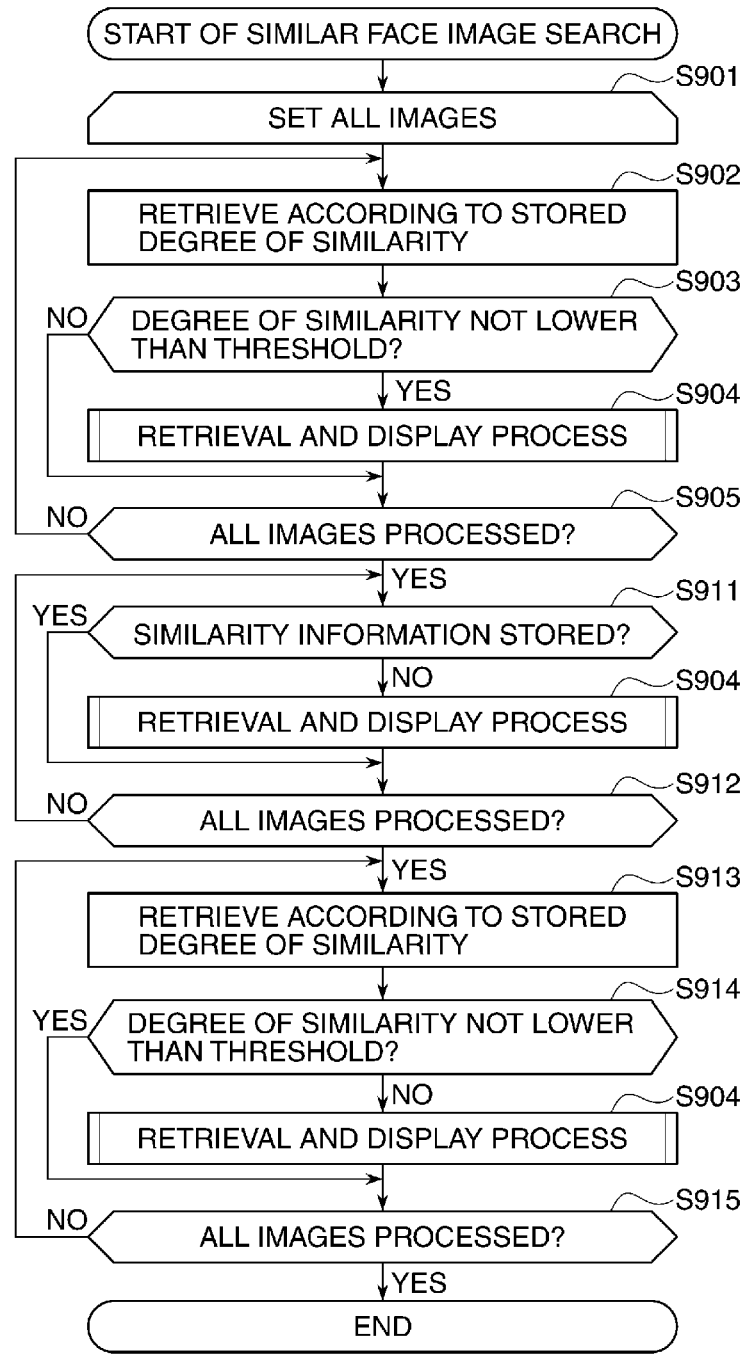
FIG. 9 is a flowchart of a first example of a similar face image search process executed by the image processing apparatus according to the second embodiment.

FIG. 9 is a flowchart of a first example of the similar face image search process executed by the image processing apparatus according to the second embodiment. The similar face image search process in FIG. 9 is executed by the CPU 101. Further, in FIG. 9, the similar face image search executed in a case where face dictionary items have been updated will be described.

As described above, when the user performs the search operation for searching for an image including a face similar to a specific face, from the operation section 103, the CPU 101 displays the user interface screen 201 on the display section 102. When the search start button 204 is depressed on the user interface screen 201, the CPU 101 starts the similar face image search process.

The CPU 101 sets all of the images stored in the secondary storage device 105 as objects to be subjected to similarity determination (step S901). Then, the CPU 101 retrieves, for a first one of the images, a degree of similarity obtained using a face dictionary item before the update from the database (hereinafter referred to as the similarity database) shown in FIG. 8 (step S902). Then, the CPU 101 determines whether or not the degree of similarity is not lower than a predetermined threshold value (step S903).

If the degree of similarity is not lower than the predetermined threshold value (YES to the step S903), the CPU 101 executes a retrieval and display process, described hereinafter (step S904), and then determines whether or not the similarity determination has been completed for all of the images (step S905).

Figure 10:
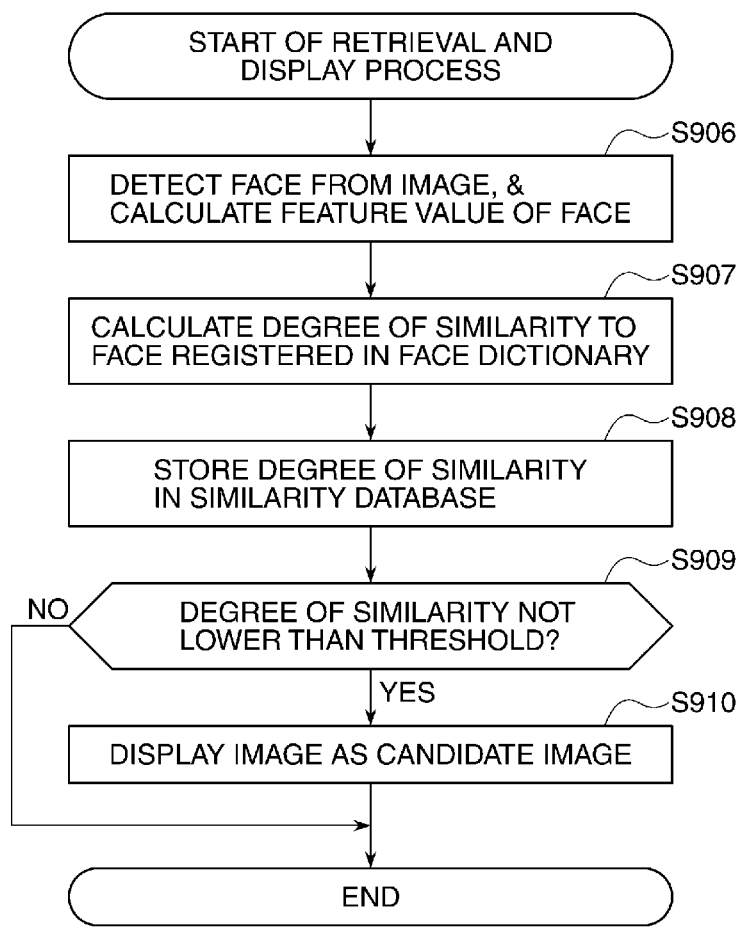
FIG. 10 is a flowchart of a retrieval and display process executed in a step in the similar face image search process shown in FIG. 9.

FIG. 10 is a flowchart of the retrieval and display process executed in the step S904 in the similar face image search process in FIG. 9.

When the retrieval and display process is started, the CPU 101 detects a face from an image, and obtains feature value data of the detected face (step S906). Then, the CPU 101 compares the obtained feature value data with the feature value data of a registered face data item in the updated face dictionary item to thereby calculate a degree of similarity (step S907).

Next, the CPU 101 stores the degree of similarity calculated in the step S907 in the similarity database (step S908). Then, the CPU 101 determines whether or not the degree of similarity calculated in the step S907 is not lower than the predetermined threshold value (step S909).

If the degree of similarity calculated in the step S907 is not lower than the predetermined threshold value (YES to the step S909), the CPU 101 displays the image on the image display area 205 as a candidate image (step S910). Then, the CPU 101 terminates the retrieval and display process, and proceeds to the step S905 in FIG. 9. Note that if it is determined in the step S903 that the degree of similarity is lower than the predetermined threshold value (NO to the step S903), the CPU 101 directly proceeds to the step S905.

If the similarity determination has not been completed for all of the images (NO to the step S905), the CPU 101 returns to the step S902, and performs the similarity determination for a next image. On the other hand, if the similarity determination has been completed for all of the images (YES to the step S905), the CPU 101 determines, for the first image, whether or not the image has a degree of similarity obtained as a result of comparison between the image and a face dictionary item before the update, as a value held in the similarity database (step S911).

If the image has no degree of similarity as a value held in the similarity database (NO to the step S911), the CPU 101 executes the above-described process in the step S904. Then, the CPU 101 determines whether or not the degree of similarity has been checked for all of the images (step S912). Note that if a degree of similarity is stored as a value held in the similarity database (YES to the step S911), the CPU 101 directly proceeds to the step S912.

If the degree of similarity has not been checked for all of the images (NO to the step S912), the CPU 101 returns to the step S911, and determines for a next image whether or not the image has a degree of similarity as a value held in the similarity database.

If the degree of similarity has been checked for all of the images (YES to the step S912), the CPU 101 retrieves, for the first image, a degree of similarity obtained using a face dictionary item before the update, from the similarity database (step S913). Then, the CPU 101 determines whether or not the degree of similarity is not lower than the predetermined threshold value (step S914).

If the degree of similarity is lower than the predetermined threshold value (NO to the step S914), the CPU 101 executes the retrieval and display process described in the step S904, and then determines whether or not the similarity determination has been completed for all of the images (step S915). Note that if the degree of similarity is not lower than the predetermined threshold value (YES to the step S914), the CPU 101 directly proceeds to the step S915.

If the similarity determination has not been completed for all of the images (NO to the step S915), the CPU 101 returns to the step S913, and performs the similarity determination for a next image. On the other hand, if the similarity determination has been completed for all of the images (YES to the step S915), the CPU 101 terminates the similar face image search.

According to the above-described process, when the similar face image search is performed after face dictionary items have been updated, an image of which the degree of similarity determined using a face dictionary item before update is not lower than the predetermined threshold value has a high possibility that a degree of similarity determined using an updated face dictionary item is also not lower than the predetermined threshold value. That is, the image has a high probability that it is determined as a candidate image when the comparison is made using the updated face dictionary item, and hence by assigning priority of similar face image search processing to the image, it is possible to reduce time taken to display the image as a candidate image.

As described above, first, as to each image of which the degree of similarity determined by comparison with a face dictionary item before update is not lower than the predetermined threshold value, it is determined whether or not the image is a candidate image according to the degree of similarity obtained using the updated face dictionary item. Next, as to each image having no degree of similarity determined by comparison with a face dictionary item before the update, it is determined according to the degree of similarity determined using the updated face dictionary item whether or not the image is a candidate image.

Then, finally, as to each image of which the degree of similarity determined by comparison with a face dictionary item before update is lower than the predetermined threshold value, it is determined according to the degree of similarity determined using the updated face dictionary item whether or not the image is a candidate image.

That is, the similar face image search is performed starting with images having a high probability of being a candidate image, and hence it is possible to promptly display candidate images on the image display area 205. As a result, the user can perform a next operation by visually checking the result of the similar face image search without being caused to wait for a long time until the candidate images are displayed.

Figure 11:
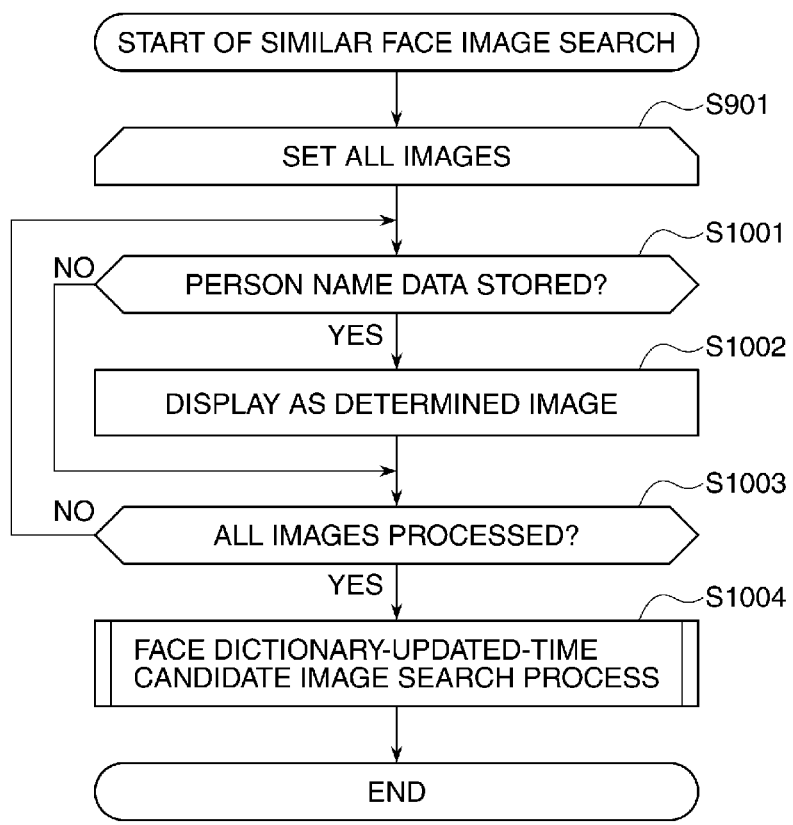
FIG. 11 is a flowchart of a second example of the similar face image search process executed by the image processing apparatus according to the second embodiment.

FIG. 11 is a flowchart of a second example of the similar face image search process executed by the image processing apparatus according to the second embodiment. The similar face image search process in FIG. 11 is executed by the CPU 101 appearing in FIG. 1. Further, in FIG. 11, the similar face image search in a case where face dictionary items have been updated will be described, and the same steps as those in the similar face image search process shown in FIG. 9 are denoted by the same step numbers.

When the similar face image search is started, the CPU 101 sets all images stored in the secondary storage device 015 in the step S901 as objects to be subjected to person name data checking. Then, the CPU 101 determines, for a first one of the images, whether or not person name data is stored in image metadata thereof (step S1001). If person name data is stored in the image metadata of the image (YES to the step S1001), the CPU 101 displays the image on the image display area 205 as a determined image (step S1002). Then, the CPU 101 determines whether or not the person name data checking has been completed for all of the images (step S1003).

If the person name data checking has not been performed for all of the images (NO to the step S1003), the CPU 101 sets a next image as an object to be subjected to person name data checking, and returns to the step S1002. Note that if no person name data is stored in the image metadata (NO to the step S1001), the CPU 101 directly proceeds to the step S1003.

If the person name data checking has been completed for all of the images (YES to the step S1003), the CPU 101 executes a face dictionary-updated-time candidate image search process (step S1004), followed by terminating the similar face image search. Note that the face dictionary-updated-time candidate image search process executed in the step S1004 is the same as the similar face image search (steps S901 to S915) described with reference to FIG. 9, and hence description thereof is omitted.

As described above, in the example shown in FIG. 9, first, as to each image of which the degree of similarity determined by comparison with a face dictionary item before the update is not lower than the predetermined threshold value, it is determined according to the degree of similarity determined using an updated face dictionary item whether or not the image is a candidate image. Next, as to each image having no degree of similarity determined by comparison with a face dictionary item before the update, it is determined according to the degree of similarity determined using an updated face dictionary item whether or not the image is a candidate image. Then, finally, as to an image of which the degree of similarity determined by comparison with a face dictionary item before the update is lower than the predetermined threshold value, it is determined according to the degree of similarity determined using an updated face dictionary item whether or not the image is a candidate image.

On the other hand, in the example shown in FIG. 11, when face dictionary items have been updated, by sorting the images according to the degree of similarity determined using the face dictionary items before the update, and performing the similar face image search in an decreasing order of degree of similarity, it is possible to preferentially process images each having a higher probability of being determined as a candidate image. This makes it possible to further reduce time taken to perform the similar face image search.

That is, in searching for an image including a face similar to a specific face after face dictionary items have been updated, first, determined images each having person name data are retrieved and displayed, and then, candidate images are retrieved and displayed. This enables the similar face image search to display the determined images each having person name data and the candidate images in a short time.

Figure 12:
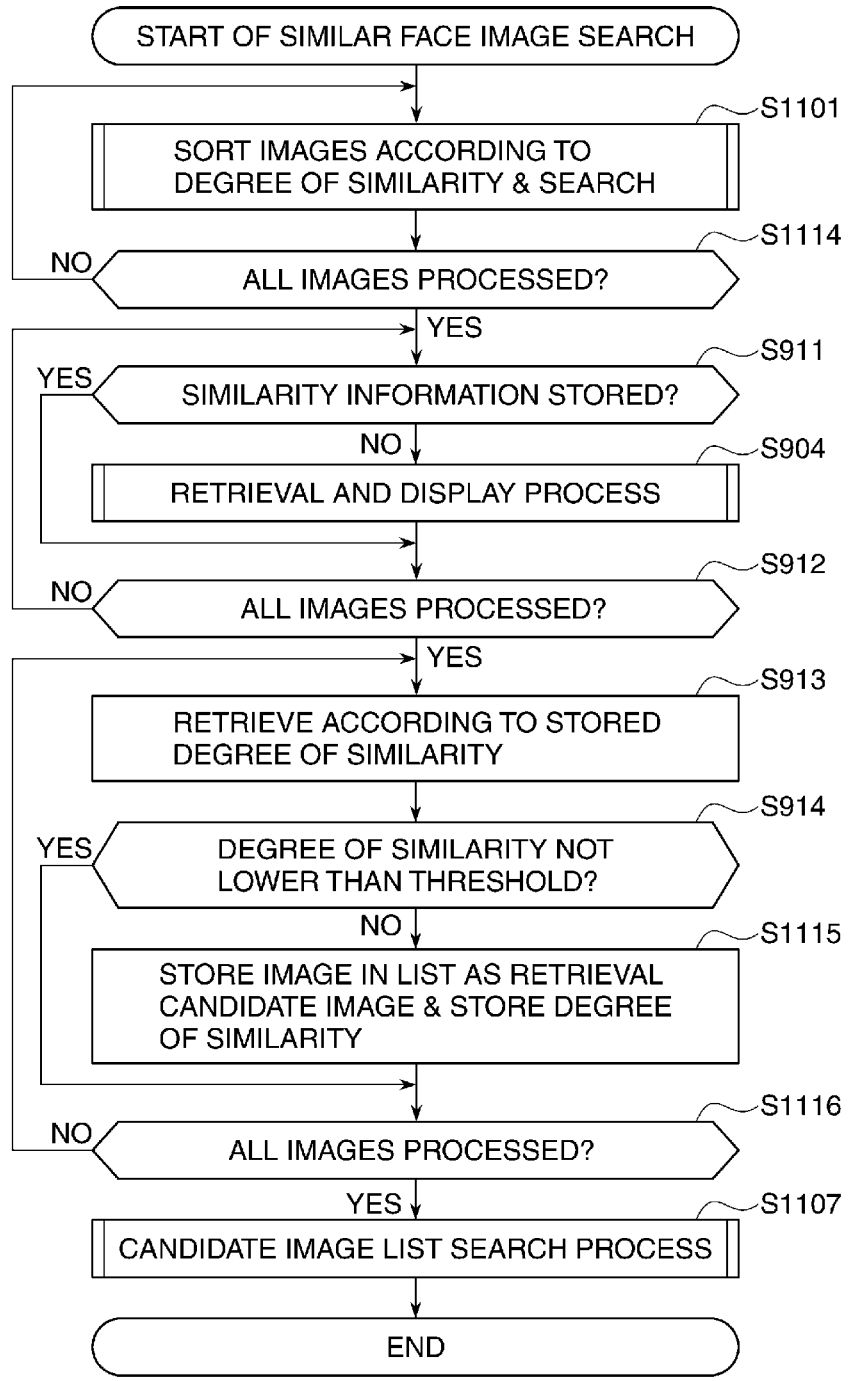
FIG. 12 is a flowchart of a third example of the similar face image search process executed by the image processing apparatus according to the second embodiment.

FIG. 12 is a flowchart of a third example of the similar face image search process executed by the image processing apparatus according to the second embodiment. The similar face image search process shown in FIG. 12 is executed by the CPU 101 appearing in FIG. 1. Further, in FIG. 12, the similar face image search in a case where a face dictionary item is updated will be described, and hence the same steps as those in the similar face image search process described with reference to FIG. 9 are denoted by the same step numbers, and description thereof is omitted.

When the similar face image search is started, first, the CPU 101 sorts all images according to the degree of similarity, and performs the search process (similarity-sorted search process: step S1101).

Figure 13:
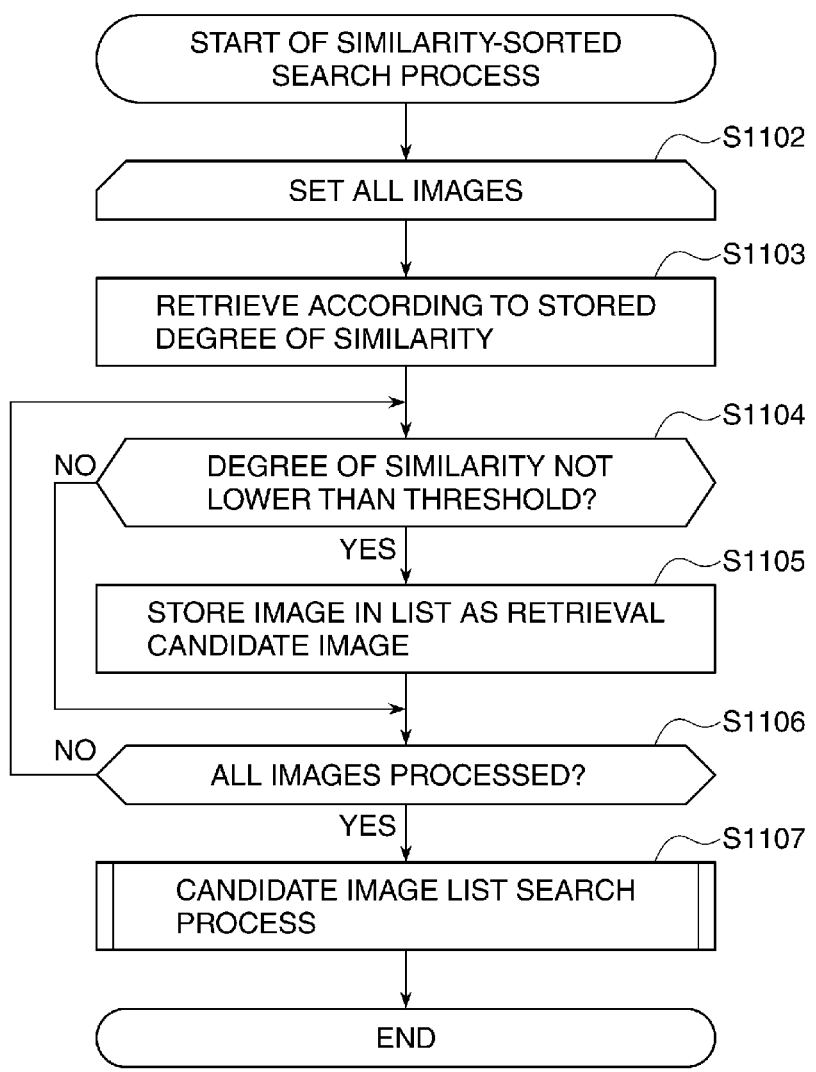
FIG. 13 is a flowchart of a similarity-sorted search process executed in a step in the similar face image search process shown in FIG. 12.

FIG. 13 is a flowchart of the similarity-sorted search process executed in the step S1101 in the similar face image search process shown in FIG. 12.

When the similarity-sorted search process is started, the CPU 101 sets all images stored in the secondary storage device 105 as objects to be subjected to similarity degree checking (step S1102). Then, the CPU 101 retrieves, for a first one of the images, a degree of similarity determined using a face dictionary item before the update, from the similarity database (step S1103). Then, the CPU 101 determines whether or not the degree of similarity is not lower than the predetermined threshold value (step S1104).

If the degree of similarity is not lower than the predetermined threshold value (YES to the step S1104), the CPU 101 stores an identification data item for identifying the image in a candidate image list (step S1105). Then, the CPU 101 determines whether or not the similarity degree checking has been completed for all of the images (step S1106). Note that if the degree of similarity is lower than the predetermined threshold value (NO to the step S1104), the CPU 101 directly proceeds to the step S1106.

If the similarity degree checking has not been performed for all of the images (NO to the step S1106), the CPU 101 returns to the step S1103, and performs the similarity degree checking for a next image. On the other hand, if the similarity degree checking has been completed for all of the images (YES to the step S1106), the CPU 101 performs the search process using the candidate image list (candidate image list search process: step S1107), followed by terminating the similarity-sorted search process.

Figure 14:
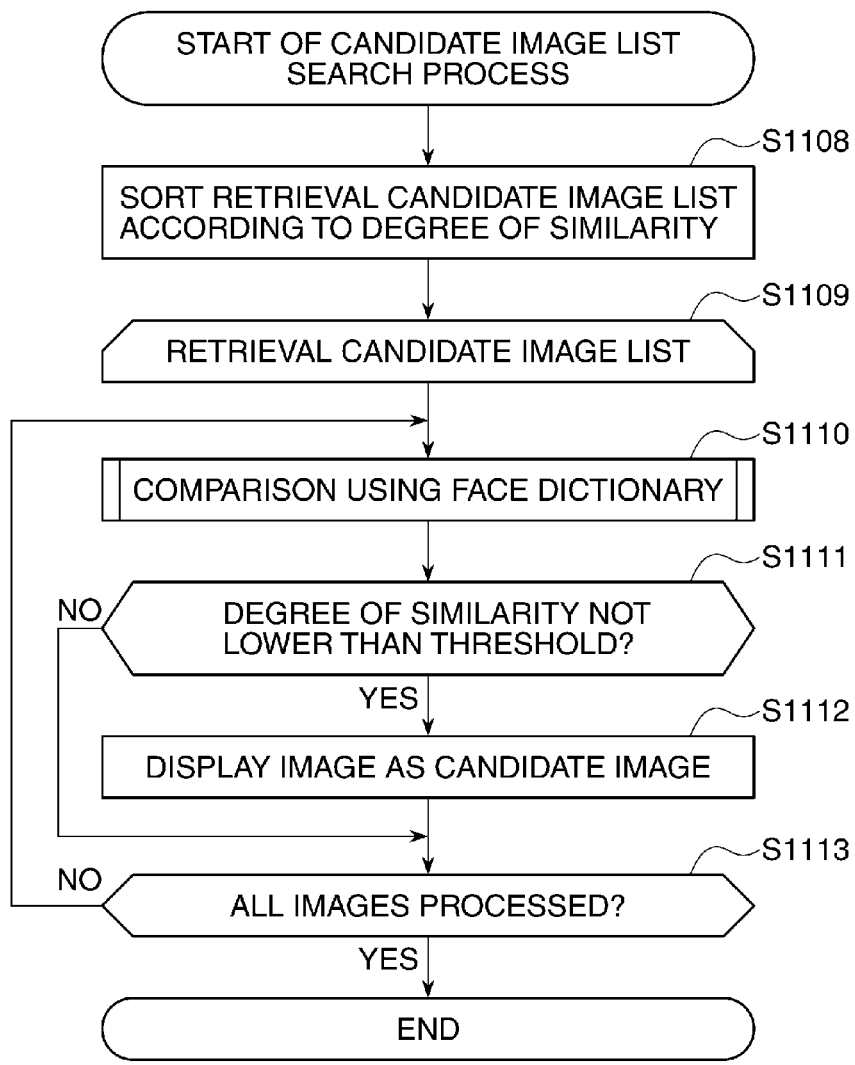
FIG. 14 is a flowchart of a candidate image list search process executed in a step in the similarity-sorted search process in FIG. 13.

FIG. 14 is a flowchart of the candidate image list search process executed in the step S1107 in the similarity-sorted search process in FIG. 13.

When the candidate image list search process is started, first, the CPU 101 sorts images stored in the candidate image list according to the degree of similarity (i.e. in decreasing order of the degree of similarity), to thereby obtain a retrieval candidate image list (step S1108). Then, the CPU 101 sets all of the images in the retrieval candidate image list as objects to be subjected to the comparison process in a sorted order thereof (step S1109).

Next, the CPU 101 compares each of the images set as the objects to be to be subjected to the comparison process with image data of the face dictionary item (step S1110). Note that the comparison process in the step S1110 is the same as executed in the steps S906 to 908 described with reference to FIG. 10, and hence description thereof is omitted.

After a degree of similarity is stored in the similarity database in the comparison process in the step S1110, the CPU 101 determines whether or not the degree of similarity is not lower than the predetermined threshold value (step S1111). If the degree of similarity is not lower than the predetermined threshold value (YES to the step S1111), the CPU 101 displays the image on the image display area 205 as a candidate image (step S1112).

Then, the CPU 101 determines whether or not the comparison process has been completed for all of the images in the retrieval candidate image list (step S1113). If the comparison process has not been completed for all of the images (NO to the step S1113), the CPU 101 returns to the step S1110, and performs the comparison process for a next image using the image data of the face dictionary item.

On the other hand, if the comparison process has been completed for all of the images (YES to the step S1113), the CPU 101 terminates the candidate image list search process. Note that if the degree of similarity is lower than the predetermined threshold value (NO to the step S1111), the CPU 101 directly proceeds to the step S1113.

When the similarity-sorted search process is terminated as described above, the CPU 101 proceeds to a step S1114 in FIG. 12 to determine whether or not the similarity-sorted search process has been completed for all of the images (step S1114). If the similarity-sorted search process has not been completed for all of the images (NO to the step S1114), the CPU 101 returns to the step S1101, and performs the similarity-sorted search process for a next image.

If the similarity-sorted search process has been completed for all of the images (YES to the step S1114), the CPU 101 executes the steps S911, S904, S912, S913, and S914 described with reference to FIG. 9.

If it is determined in the step S914 that the degree of similarity is lower than the predetermined threshold value (NO to the step S914), the CPU 101 stores the identification data for identifying the image in the retrieval candidate image list (step S1115). Then, the CPU 101 determines whether or not the determination according to the degree of similarity has been completed for all of the images (step S1116).

If the determination according to the degree of similarity has not been completed for all of the images (NO to the step S1116), the CPU 101 returns to the step S913, and performs the determination for a next image according to the degree of similarity. On the other hand, if the determination according to the degree of similarity has been completed for all of the images (YES to the step S1116), the CPU 101 executes the same candidate image list search process (step S1107) as described with reference to FIG. 13, followed by terminating the similar face image search process.

FIG. 15 is a flowchart of a fourth example of the similar face image search process executed by the image processing apparatus according to the second embodiment. The similar face image search process in FIG. 15 is executed by the CPU 101 appearing in FIG. 1. Further, in FIG. 15, the similar face image search in a case where face dictionary item is updated will be described, and the same steps as those in the similar face image search process in FIG. 9 are denoted by the same step numbers, and description thereof is omitted.

In the above-described first embodiment, in the similar face image search process described with reference to FIG. 6A, the description has been given of the example in which when a face dictionary item is updated, candidate images are retrieved and displayed according to stored face search information. On the other hand, in FIG. 15, when a face dictionary item is updated, images each having a degree of similarity not lower than the predetermined threshold value are displayed as candidate images, using stored degrees of similarity. Then, after the images each having a degree of similarity not lower than the predetermined threshold value are displayed, the degree of similarity is calculated using the updated face dictionary item, and if the calculated degree of similarity is lower than the predetermined threshold value, the image caused to be not displayed.

The CPU 101 sets all of the images stored in the secondary storage device 105 as objects to be subjected to similarity degree checking (step S901), and then determines for a first one of the images whether or not the image has a degree of similarity obtained as a result of comparison between the image and the face dictionary item before the update, as a value held in the similarity database (step S1201). If the image has a degree of similarity as a value held in the similarity database (YES to the step S1201), the CPU 101 determines whether or not the degree of similarity is not lower than the predetermined threshold value (step S1202).

If the degree of similarity is not lower than the predetermined threshold value (YES to the step S1202), the CPU 101 displays the image on the image display area 205 as a candidate image (step S1203), and then stores the image in a display image list as the display image (step S1204).

Next, the CPU 101 determines whether or not the similarity degree checking has been completed for all of the images (step S1205). Note that if the image has no degree of similarity as a value held in the similarity database (NO to the step S1201), the CPU 101 directly proceeds to the step S1205. Further, if the degree of similarity is lower than the predetermined threshold value (NO to the step S1202), the CPU 101 directly proceeds to the step S1205.

If the similarity degree checking has not been completed for all of the images (NO to the step S1205), the CPU 101 returns to the step S1201, and determines, for a next image, whether or not it has a degree of similarity as a value held in the similarity database. On the other hand, if the similarity degree checking has been completed for all of the images (YES to the step S1205), the CPU 101 sets all of the images in the display image list as objects to be subjected to the comparison process (step S1206), and stores, in the similarity database, a degree of similarity determined by performing the comparison process described as to the step S1110 in FIG. 14 using the updated face dictionary item (step S1207).

Next, the CPU 101 determines whether or not the degree of similarity determined in the step S1207 is not lower than the predetermined threshold value (step S1208). If the degree of similarity is lower than the predetermined threshold value (NO to the step S1208), the CPU 101 removes (deletes) the image from the candidate images displayed on the image display area 205 to cause the image not to be displayed (step S1209).

Next, the CPU 101 determines whether or not the similarity degree checking has been completed for all of the images in the display image list (step S1210). Note that if the similarity is not lower than the predetermined threshold value (YES to the step S1208), the CPU 101 directly proceeds to the step S1210.

If the similarity degree checking has not been completed for all of the images (NO to the step S1210), the CPU 101 returns to the step S1207, and calculates a degree of similarity for a next image in the list using the image data of the updated face dictionary item. On the other hand, if the similarity degree checking has been completed for all of the images (YES to the step S1210), the CPU 101 terminates the similar face image search process.

As described above, in this example, when a face dictionary item is updated, an image having a degree of similarity not lower than the predetermined threshold value is displayed as a candidate image, using stored degrees of similarity of images. Further, after displaying the image having a degree of similarity not lower than the predetermined threshold value, a degree of similarity is calculated using the updated face dictionary item, and if the calculated degree of similarity is lower than the predetermined threshold value, the image is caused to be not displayed, and hence it is possible to display images retrieved by the similar face image search in a shorter time.

As described above, in the embodiments of the preset invention, it is possible to perform the processing for searching for similar images in a short time even when an image is newly added, and further, it is possible to perform the processing for searching for similar images in a short time also when a face dictionary item is updated.

That is, in the embodiments of the present invention, results of comparison of feature value data between a face dictionary item and an image, made in the face image search, are stored, and the stored comparison results are used for the next face image search, and hence it is possible to perform the face image search process and the process for displaying the candidate images at high speed.

Further, even when a face dictionary item is updated, the search process is executed on images in decreasing order of probability of being a candidate image, and hence it is possible to display candidate images at high speed.

As is clear from the above description, in the example shown in FIG. 1, the CUP 101 functions as a determination unit, a first processing unit, a second processing unit, a third processing unit, and an update unit. Further, the CPU 101, the user interface screen shown in FIG. 2, and the operation section 103 function as a setting unit.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-168549, filed Jul. 30, 2012, which is hereby incorporated by reference herein in its entirety.

What is claimed is:

1. An image processing apparatus that retrieves a specific image including a specific object area from a plurality of images, comprising:
    a storage unit configured to store management information of each of the images;
    a determination unit configured to determine whether or not object search information exists in the management information;
    a first processing unit configured to, in a case where said determination unit determines that the object search information does not exist, refer to an object dictionary in which feature items of objects are registered, and compare a feature item of an object detected from an image and the feature items of the object dictionary to thereby retrieve candidate images as candidates of the specific image; and
    a second processing unit configured to, in a case where said determination unit determines that the object search information exists, retrieve the candidate images based on the object search information.

2. The image processing apparatus according to claim 1, further comprising a third processing unit configured to, in a case where the management information includes identification information indicative of the specific image, determine an image to which the management information is attached, as the specific image.

3. The image processing apparatus according to claim 2, wherein when searching for the specific image is performed, said third processing unit, second processing unit, and first processing unit, in this order, performs retrieval.

4. The image processing apparatus according to claim 1, further comprising a display unit configured to display retrieved images,
    wherein said display unit displays each candidate image retrieved by said first or second processing unit, together with display information indicating that the retrieved image is a candidate image.

5. The image processing apparatus according to claim 1, further comprising a display unit configured to display retrieved images,
    wherein said display unit displays the specific image retrieved by said third processing unit, together with information indicating that the retrieved image is the specific image.

6. The image processing apparatus according to claim 1, wherein when the object dictionary is updated, said first processing unit determines the object search information by referring to the updated object dictionary, for images each determined, according to the object search information before update of the object dictionary, not to be a candidate of the specific image, and for images of which the object search information was determined, according to the object search information before the update of the object dictionary, not to exist.

7. The image processing apparatus according to claim 1, wherein the object search information is one of information indicating that the image is a candidate of the specific image, information indicating that the image is finally determined as the specific image, information indicating that the image is not a candidate of the specific image, and information indicating that the image is not the specific image.

8. The image processing apparatus according to claim 1, wherein the object search information is similarity information determined by comparison with the feature items included in the object dictionary.

9. The image processing apparatus according to claim 1, further comprising an update unit configured to update, when the object dictionary is updated, the object search information by comparing the feature items in the updated object dictionary with the feature item of the image.

10. The image processing apparatus according to claim 1, further comprising a setting unit configured to set whether or not each candidate image displayed on said display unit is the specific image.

11. The image processing apparatus according to claim 1, wherein when the candidate images are displayed, said display unit displays the candidate images in decreasing order of degree of similarity to an object included in the object dictionary.

12. The image processing apparatus according to claim 1, wherein when the object dictionary is updated, said first processing unit retrieves images of which the degree of similarity in the object dictionary before update thereof is not lower than a predetermined threshold value, by referring to the updated object dictionary.

13. The image processing apparatus according to claim 1, wherein when the object dictionary is updated, said first processing unit retrieves, by searching images of which the degree of similarity in the object dictionary before update thereof is not lower than a predetermined threshold value, images having no data of similarity in the object dictionary before the update, and images of which the degree of similarity in the object dictionary before the update is lower than the predetermined threshold value, in the mentioned order, by referring to the updated object dictionary.

14. The image processing apparatus according to claim 1, wherein when the object dictionary is updated, said first processing unit sorts images of which the degree of similarity in the object dictionary before the update is not lower than the predetermined threshold value, in decreasing order of the degree of similarity, and then retrieves the images, by referring to the updated object dictionary.

15. The image processing apparatus according to claim 1, wherein when the object dictionary is updated, said second processing unit retrieves, based on the degree of similarity before update of the object dictionary, the candidate images which are candidates of the specific image, and said first processing unit causes any of the candidate images displayed on said display unit not to be displayed, when the degree of similarity calculated therefor according to the updated object dictionary is lower than the predetermined threshold value.

16. The image processing apparatus according to claim 1, wherein the object area is a face area.

17. A method, using a processor, of controlling an image processing apparatus that retrieves a specific image including a specific object area from a plurality of images, comprising:
    storing management information of each of the images;
    determining, using the processor, whether or not object search information exists in the management information;
    referring, in a case where said determining determines that the object search information does not exist, to an object dictionary in which feature items of objects are registered, and comparing a feature item of an object detected from an image and the feature items of the object dictionary to thereby retrieve candidate images as candidates of the specific image; and
    retrieving, in a case where said determining determines that the object search information exists, the candidate images based on the object search information.

18. A non-transitory computer-readable storage medium storing a program for causing a computer to execute a method of controlling an image processing apparatus that retrieves a specific image including a specific object area from a plurality of images,
    wherein the method comprises:
    storing management information of each of the images;
    determining whether or not object search information exists in the management information;
    referring, in a case where said determining determines that the object search information does not exist, to an object dictionary in which feature items of objects are registered, and comparing a feature item of an object detected from an image and the feature items of the object dictionary to thereby retrieve candidate images as candidates of the specific image; and
    retrieving, in a case where said determining determines that the object search information exists, the candidate images based on the object search information.

* * * * *